US009446925B2

(12) United States Patent
Lee

(10) Patent No.: US 9,446,925 B2
(45) Date of Patent: Sep. 20, 2016

(54) MEDIUM PROCESSING APPARATUS AND FINANCIAL DEVICE

(71) Applicant: LG CNS CO., LTD., Seoul (KR)

(72) Inventor: Sumin Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 14/612,771

(22) Filed: Feb. 3, 2015

(65) Prior Publication Data

US 2015/0217961 A1 Aug. 6, 2015

(30) Foreign Application Priority Data

Feb. 4, 2014 (KR) ........................ 10-2014-0012552

(51) Int. Cl.

| | |
|---|---|
| ***G06Q 40/00*** | (2012.01) |
| ***G07D 11/00*** | (2006.01) |
| ***G07F 19/00*** | (2006.01) |
| ***B65H 29/22*** | (2006.01) |
| ***B65H 31/00*** | (2006.01) |
| ***B65H 29/52*** | (2006.01) |
| ***B65H 31/06*** | (2006.01) |

(52) U.S. Cl.

CPC .............. *B65H 29/22* (2013.01); *B65H 29/52* (2013.01); *B65H 31/00* (2013.01); *B65H 31/06* (2013.01); *G07F 19/202* (2013.01); *G07F 19/203* (2013.01); *B65H 2301/42142* (2013.01); *B65H 2404/1114* (2013.01); *B65H 2701/1912* (2013.01)

(58) Field of Classification Search

USPC .................. 235/379, 381, 375; 271/272, 274

See application file for complete search history.

(56) References Cited

U.S. PATENT DOCUMENTS

| | | | | |
|---|---|---|---|---|
| 8,517,479 B2 * | 8/2013 | Lee | G07F 19/20 | 186/37 |
| 2005/0056575 A1 * | 3/2005 | Lee | B65H 7/12 | 209/586 |
| 2008/0001351 A1 * | 1/2008 | Lee | B65H 29/14 | 271/306 |
| 2010/0156032 A1 * | 6/2010 | Trudeau | B65H 29/145 | 271/117 |
| 2011/0031308 A1 * | 2/2011 | Holland-Letz | B65H 1/025 | 235/379 |
| 2012/0219334 A1 * | 8/2012 | Maruyama | G03G 15/1685 | 399/313 |

FOREIGN PATENT DOCUMENTS

| | | |
|---|---|---|
| JP | 2002348016 A | 12/2002 |
| JP | 2013025581 A | 2/2013 |

(Continued)

OTHER PUBLICATIONS

Office Action dated May 21, 2015 in Korean Application No. 10-2014-0012552.

Office Action dated Nov. 26, 2015 in Korean Application No. 10-2014-0012552.

(Continued)

*Primary Examiner* — Edwyn Labaze

(74) *Attorney, Agent, or Firm* — Saliwanchik, Lloyd & Eisenschenk

(57) ABSTRACT

The medium processing apparatus comprises a stacking surface on which a medium is stacked, first and second transfer rollers for transferring the medium to be stacked onto the stacking surface, a sheet roller for hitting the medium transferred by the first and second transfer rollers, and a rotation shaft to which the sheet roller is connected. The sheet roller comprises a body part connected to the rotation shaft and a contact part extending from the body part, and at least one portion of the body part of the sheet roller is disposed above the stacking surface.

16 Claims, 6 Drawing Sheets

(56) References Cited

FOREIGN PATENT DOCUMENTS

| | | | |
|---|---|---|---|
| KR | 20020062148 | A | 7/2002 |
| KR | 20100059139 | A | 6/2010 |

OTHER PUBLICATIONS

Notice of Allowance dated May 25, 2016 in Korean Application No. 10-2014-0012552.

* cited by examiner

MEDIUM PROCESSING APPARATUS AND FINANCIAL DEVICE

CROSS-REFERENCE TO RELATED APPLICATION

This application claims the benefit under 35 U.S.C. §119 of Korean Patent Application No. 10-2014-0012552, filed Feb. 4, 2014, which is hereby incorporated by reference in its entirety.

BACKGROUND

The present disclosure relates to a medium processing apparatus and a financial device.

In general, financial devices are devices for processing financial business desired by customers. Financial devices may deposit/withdraw a medium or automatically transfer a medium. The financial devices comprise a medium processing apparatus for depositing or withdrawing a medium.

FIG. 1 is a view of a medium processing apparatus according to a prior art.

Referring to FIG. 1, a medium processing apparatus 1 according to the prior art comprises an stacking surface 6 on which a medium is stacked, first and second transfer rollers 2 and 4 for transferring a medium to be stacked onto the stacking surface 6, a stacking guide 5 for guiding stacking of the transferred medium, a damper 7 with which the medium passing through the first and second transfer rollers 2 and 4 collide, and a support guide 8 for supporting the stacked medium.

A sheet roller 3 for hitting the medium so that the transferred medium is stably stacked on the stacking surface 6 is connected to a rotation shaft 2A of the first transfer roller 2. The sheet roller 3 may comprise a plurality of contact parts 3A that are spaced apart from each other to hit the medium. That is, the sheet roller 3 comprises a body coupled to the rotation shaft 2A and the plurality of contact parts 3A extending from the body.

The plurality of contact parts 3A may radially extend from the sheet roller 3. For example, each of the plurality of contact parts 3A may be formed of a rubber material. A rotation trajectory of the contact part 3A of the sheet roller 3 is defined as shown by reference symbol 38.

To stack the medium, the medium passes between the first and second transfer rollers 2 and 4. The sheet roller 3 may rotate together with the first transfer roller 2 in a counterclockwise direction to allow the contact part to push the medium toward the damper while the medium passes between the first and second transfer rollers 2 and 4.

The medium passing between the first and second transfer rollers 2 and 4 may ascend along the stacking guide 5 to collide with a bottom surface of the damper 7 as shown by reference A. Then, the medium colliding with the bottom surface of the damper 7 may be deformed as shown by reference B.

The deformed medium may be recovered while moving downward by the self-weight thereof as shown by reference C. Here, the contact part of the sheet roller 3 rotating in the counterclockwise direction may hit the medium. The hit medium may collide with the stacking surface 6 in a state where a lower end of the medium is unfolded as shown by reference D and then be supported by the support guide 8 as shown by reference E.

Here, the first transfer roller 2 and the body of the sheet roller 3 as well as the rotation shaft 2A may be disposed under the stacking surface 6. Therefore, the contact part 3A has to have a long length to hit the medium. Thus, the contact part 3A may collide with peripheral parts of the sheet roller while the sheet roller 3 rotates to reduce the lifespan of the sheet roller 3 due to abrasion of the sheet roller 3 and cause a lot of noises.

BRIEF SUMMARY

Embodiments provide a medium processing apparatus and a financial device.

In one embodiment, a medium processing apparatus comprises: a stacking surface on which a medium is stacked; first and second transfer rollers for transferring the medium to be stacked onto the stacking surface; a sheet roller for hitting the medium transferred by the first and second transfer rollers; and a rotation shaft to which the sheet roller is connected, wherein the sheet roller comprises a body part connected to the rotation shaft and a contact part extending from the body part, and at least one portion of the body part of the sheet roller is disposed above the stacking surface.

In another embodiment, a financial device comprises: a customer information acquisition part for acquiring information of a customer; a user interface for displaying a menu or information for depositing or withdrawing a medium and inputting or selecting a command or information for depositing or withdrawing the medium; and a medium processing apparatus for accepting and dispensing the medium, wherein the medium processing apparatus comprises: a stacking surface on which the medium is stacked; and a sheet roller comprising a body part and at least one contact part extending from the body part to hit the medium to be stacked on the stacking surface, wherein a portion or whole of the body part is disposed above the stacking surface.

The details of one or more embodiments are set forth in the accompanying drawings and the description below. Other features will be apparent from the description and drawings, and from the claims.

DETAILED DESCRIPTION

Figure 1:
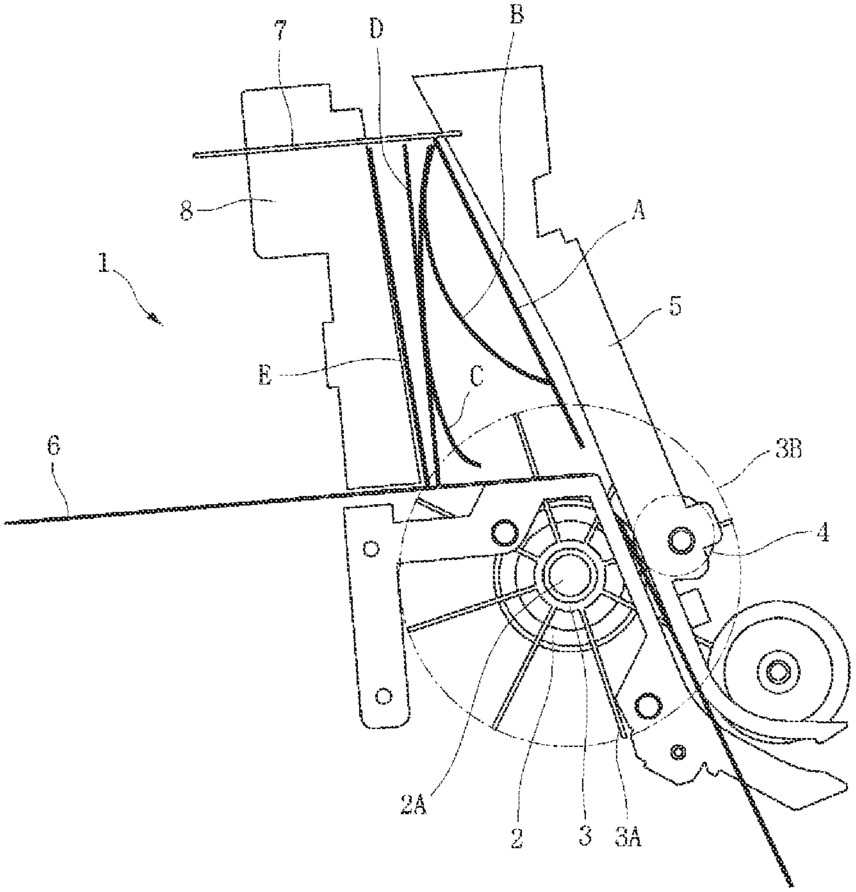
Fig. 1 PRIOR ART
FIG. 1 is a view of a medium processing apparatus according to a prior art.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc, For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

Figure 2:
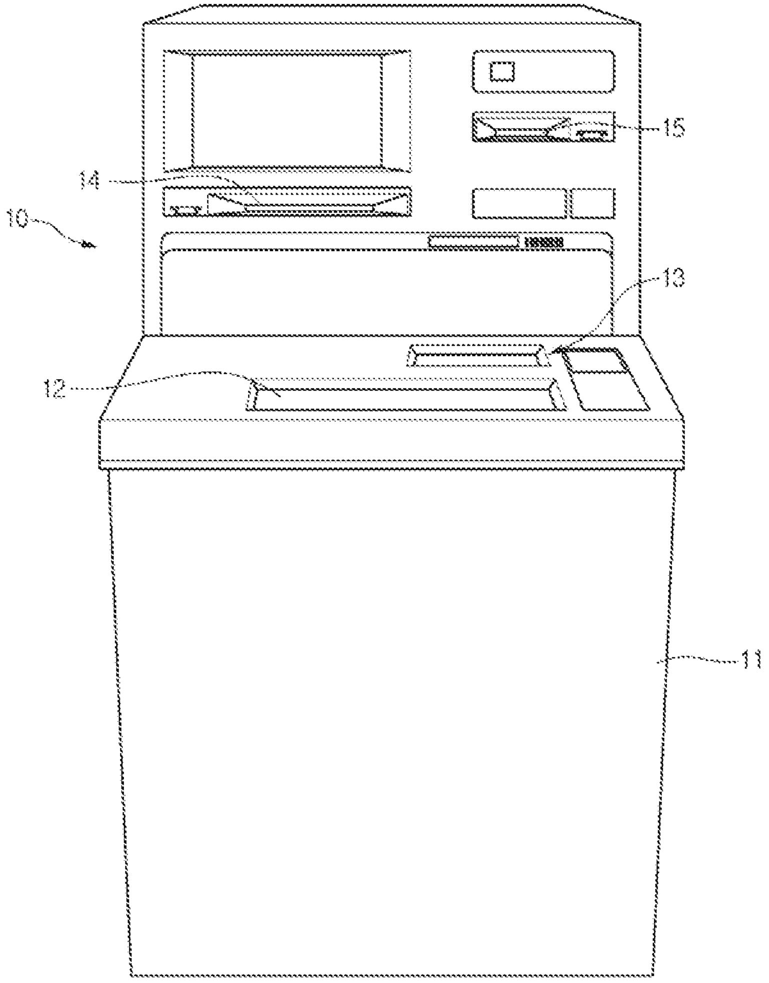
FIG. 2 is a perspective view of a financial device according to an embodiment.
Figure 3:
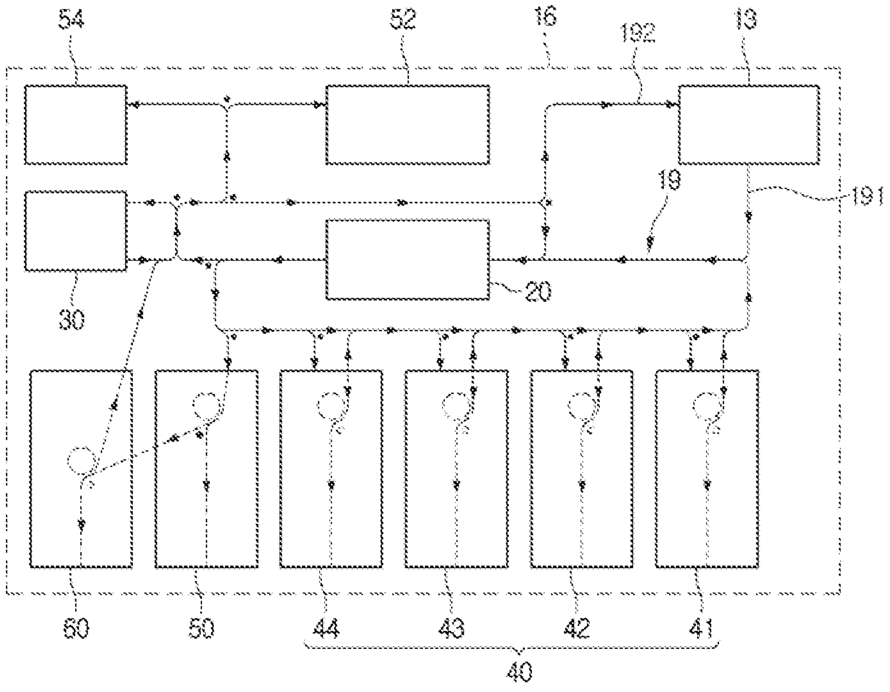
FIG. 3 is a configuration view of the financial device according to an embodiment.

FIG. 2 is a perspective view of a financial device according to an embodiment, and FIG. 3 is a configuration view of the financial device according to an embodiment.

Referring to FIGS. 2 and 3, a financial device 1 according to an embodiment comprises a main body 11 in which a plurality of components are built. The main body 11 may comprise a medium entrance part 13 for accepting and dispensing a medium and at least one medium storage box 40 for storing the medium. The at least one medium storage box 40 may be separably mounted on the main body 11.

The medium entrance part 13 may comprise a medium processing space that is accessible by a customer.

The medium entrance part 13 may serve as a common entrance part through which various kinds of media are acceptable or withdrawable. The media may be accepted into the medium entrance part 13 in a unit of bundle comprising a sheet of medium. Also, the media in unit of bundle may be dispensed from the medium entrance part 13.

Also, the medium entrance part 13 may further comprise a medium processing apparatus (see reference numeral 100 of FIG. 4) for processing the medium accepted into the medium processing space. The medium processing apparatus will be described later.

Also, according to the kind of financial device 10, the financial device 10 may further comprise a bankbook entrance part 14 for accepting or dispensing a bankbook and a card entrance part 15 for accepting or dispensing a card. In the current embodiment, the bankbook entrance part 14 or the card entrance part 15 may be called as a customer information acquisition part for acquiring information of a customer. The current embodiment is not limited to the kind of customer information acquisition part. For example, the customer's information may be acquired by using information recorded in an RFID tag or USB or a customer's fingerprint.

Also, the financial device 10 may further comprise a user interface 12 for displaying a menu or information for depositing or withdrawing the medium and inputting or selecting a command or information for depositing or withdrawing the medium.

The financial device 10 may further comprise a discrimination part 20. The discrimination part 20 may distinguish the kind of medium or determine faulty medium when the medium is taken in or out.

The financial device 10 may further comprise a temporary stacking part 30 in which the medium is temporarily stacked. The temporary stacking part 30 may temporarily store a medium accepted through the medium entrance part 13 when the customer intends to deposit the medium into the financial device 10. The medium stacked in the temporary staking part 30 may be transferred into the medium storage box 40 that will be described later when medium acceptance is finally decided by the customer.

The financial device 10 may further comprise the medium storage box 40 for storing the medium. The medium storage box 40 may comprise at least one bill storage box 41, 42, and 43 and at least one check storage box 44. This specification is not limited to the number of bill storage box 41, 42, and 43 and check storage box 44. Thus, only the bill storage box may be provided in the financial device 10. Alternatively, only the check storage box may be provided in the financial device 10.

The medium storage box 40 may have a medium inlet for accepting the transferred medium and a medium outlet for dispensing internally stacked medium to the outside. In general, the medium inlet and the medium outlet may be disposed in an upper end of the box that defines an outer appearance of the medium storage box 40.

Also, a medium stacking unit for stacking media transferred from the outside of the medium storage box 40 in parallel to each other and a medium pick-up unit for separating the stacked media one by one to transmit the separated medium to the outside of the medium storage box 40 are disposed in the medium storage box 40. That is, the medium stored in the medium storage box 40 may be dispensed to the outside, and the deposited medium may be stored in the medium storage box 40.

The financial device 10 may further comprise a first recovery box 50 for storing a medium that is determined as faulty in the deposit process, a second recovery box 52 for storing a medium that is determined as faulty in the withdrawal process, and a recovery supplement box 60.

The recovery and supplement box 60 may supplement a medium into the medium storage box 40 or recover a medium from the medium storage box 40. Also, the financial device 10 may further comprise a third recovery box 54 for recovering a non-accepted medium when the customer does not accept the medium that is dispensed from the medium entrance part 13 so as to be withdrawn. Of course, in the current embodiment, at least one of the first and second recovery boxes 50 and 52, the recovery supplement box 60, and the third recovery box 54 may be omitted.

In the current embodiment, respective modules (the medium entrance part, the discrimination part, the medium storage box, the temporary stacking part, and the recovery box) constituting the financial device 10 may be connected to each other by a transfer path 19.

The transfer path 19 may comprise a first path 191 and second path 192, which are connected to the medium entrance part 13.

Figure 4:
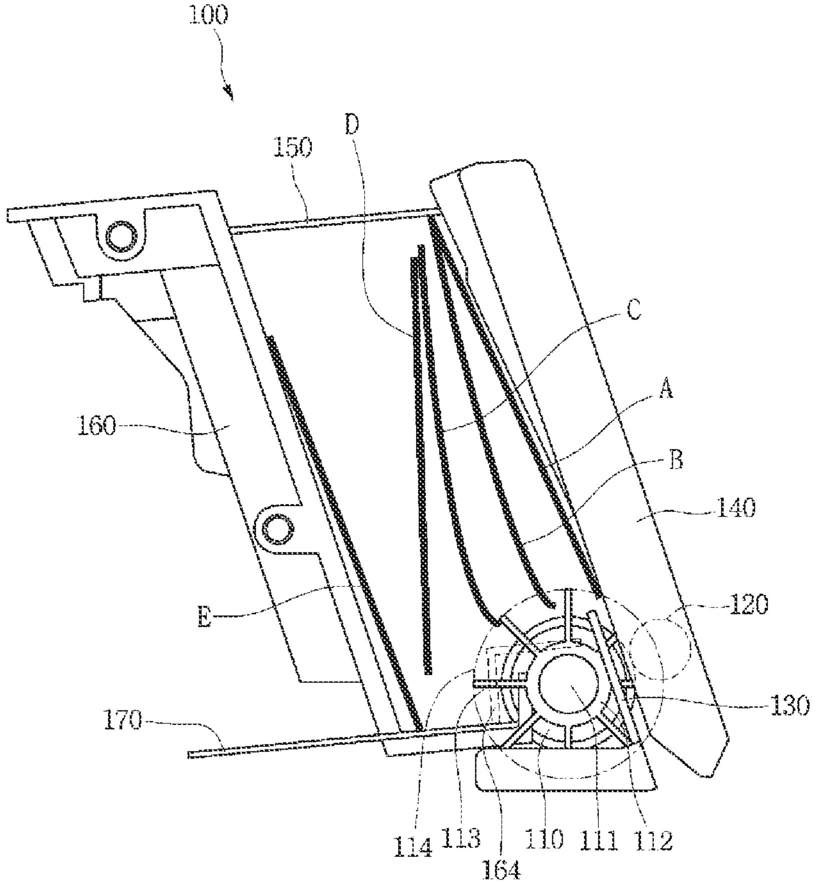
FIG. 4 is a schematic view of a medium processing apparatus according to an embodiment.
Figure 5:
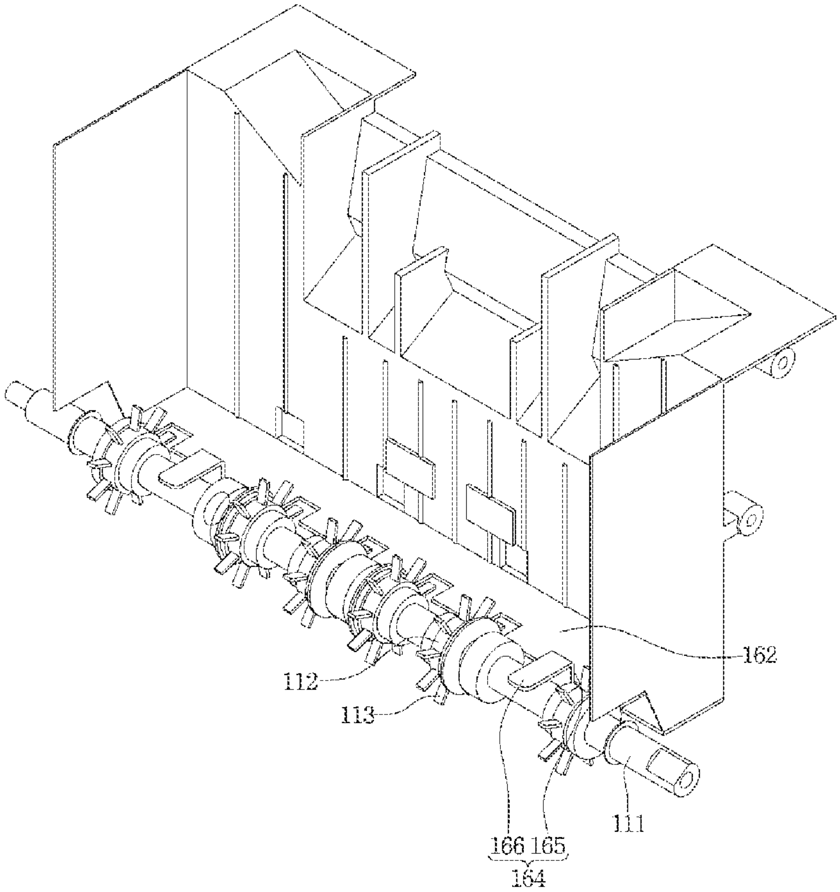
FIG. 5 is a view of a stopper for preventing a medium from being inserted between the rotation shaft and the support guide.

FIG. 4 is a schematic view of a medium processing apparatus according to an embodiment, and FIG. 5 is a view of a stopper for preventing a medium from being inserted between the rotation shaft and the support guide.

Referring to FIGS. 4 and 5, the medium processing apparatus 100 according to an embodiment may stack a medium for withdrawing or a medium that is returned.

The medium processing apparatus 100 may comprise an stacking surface 170 on which the medium is stacked, first and second transfer rollers (feed and gate rollers) 110 and 120 for transferring the medium to be stacked on the stacking surface 170, sheet rollers 112 and 113 for hitting the medium to stack the medium, a stacking guide 140 for guiding stacking of the transferred medium, a damper 150 to which the medium passing between the first and second transfer rollers 110 and 120 collide, and a support guide 160 for supporting the stacked medium.

The support guide 160 may receive a power of a driving source that is not illustrated to move in a left/right direction in FIG. 4. Thus, when number of the medium stacked on the stacking surface 170 increases, the support guide 160 may move in a left direction in FIG. 4.

The sheet rollers 112 and 113 may comprise a body part 112 connected to a rotation shaft 111 and a plurality of contact parts 113 extending from the body part 112. Also, the first transfer roller 110 may be connected to the rotation shaft 111. Thus, the sheet rollers 112 and 113 may rotate together with the first transfer roller 110 by rotation of the rotation shaft 111.

The plurality of contact parts 113 may radially extend from the body part 112 and be spaced apart from each other. For example, each of the plurality of contact parts 113 may be formed of a rubber material. A rotation trajectory of the contact part 113 may be defined as reference number 114.

In the current embodiment, to minimize noises generated when the sheet rollers 112 and 113 rotate by reducing a length of the contact part 113, at least one portion of the rotation shaft 111 may be disposed at a position above the stacking surface 170.

Since at least one portion of the rotation shaft 111 is disposed above the stacking surface 170, at least one portion of the first transfer roller 110 and at least one portion of the sheet rollers 112 and 113, which are coupled to the rotation shaft 111, may be disposed above the stacking surface 170.

Also, a portion or whole of the second transfer roller 120 may be disposed above the stacking surface 170, In FIG. 4, for example, a whole of the rotation shaft 111 and a whole of the second transfer roller 120 are disposed above the stacking surface 170.

Here, since the medium has to pass between the first transfer roller 110 and the second transfer roller 120, of which at least one portion is disposed above the stacking surface 170, at least one of a guide 130 for transferring the medium may be disposed above the stacking surface 170. Here, the guide 130 may guide the medium independently or together with the stacking guide 140 toward the first and second transfer rollers 110 and 120.

A distance between the damper 150 and the stacking surface 170 in a direction parallel to a transfer direction of the medium may be greater than the sum of a height of the tallest medium and a radius of the first transfer roller 110. Also, a minimum distance between a center of the rotation shaft 111 and the damper 150 in a direction parallel to the transfer direction of the medium may be greater than the sum of the radius of the first transfer roller 110 and the height of the tallest medium.

Also, a distance between the damper 150 and the stacking surface 170 may be greater than the sum of a height of the shortest medium and the length of the contact part 113. Also, the contact part 113 may have a length less than a diameter of the first transfer roller 110.

Thus, it may prevent the medium colliding with the damper 150 from contacting the first transfer roller 110. In the present disclosure, the medium may comprise a first side having a relatively large length and a second side having a length shorter than that of the first side and perpendicular to the first side. For example, the height of the medium may be the length of the second side of the medium. Of course, the height of the medium may be the first side depending on the transfer direction of the medium.

Also, a distance between the damper 150 and the stacking surface 170 in a direction parallel to the transfer direction of the medium may be greater than that between each of contact points on which the first and second transfer rollers 110 and 120 contact the medium and the damper 150.

The medium processing apparatus 100 may further comprise stoppers 162 and 164. The stoppers 162 and 164 may prevent the medium from being jammed in a space between the rotation shaft 111 and the support guide 160. The stoppers 162 and 164 may further comprise a support part 162 fixed to the stacking surface 170 and an extension part 164 extending from the support part 162. The extension part 164 may shield at least one portion of the space between the rotation shaft 111 and the support guide 160. The extension part 164 may comprise a first portion 165 bent from the support part 162 and a second portion 166 bent from the first portion 165.

At least one portion of the extension part 164 may be disposed above the rotation shaft 111. Also, the extension part 164 may extend toward an upper portion of the rotation shaft 111. For example, at least a portion of the second portion 166 may overlap the rotation shaft 111 in an up and down direction.

Since the medium contacts the stoppers 162 and 164 even though the sheet rollers 112 and 113 pulls the medium while the sheet rollers 112 and 113 rotate, it may prevent the medium from being inserted between the rotation shaft 111 and the support guide 160.

Hereinafter, an operation of the medium processing apparatus according to the current embodiment will be described.

The medium is transferred along the transfer path 19 and stacked. The medium transferred along the transfer path 19 may pass between the first and second transfer rollers 110 and 120 to collide with the damper 150 as shown by reference A. The medium colliding with the damper 150 may be deformed as shown by reference B. Also, the medium may move downward and thus be spaced apart from the damper 150 as shown by reference C to allow the contact part 113 of the sheet rollers 112 and 113 rotating in a counterclockwise direction in FIG. 4 to hit the medium as shown by reference C.

Here, since a distance between the damper 150 and the stacking surface 170 in a direction parallel to the transfer direction of the medium is greater than that between each of the contact points on which the medium contacts the first and second transfer rollers 110 and 120 and the damper 150, a distance between each of contact points on which the medium completely passes between the first transfer roller 110 and the second transfer roller 120 and a spot on which the medium collides with the damper 150 may be reduced.

Thus, the medium may be reduced in deformation in a state where the medium collides with the damper 150. If the deformation of the medium colliding with the damper 150 is large, a straight length of the deformed medium is less than a distance between the damper 150 and the contact part 113 of the sheet roller 112. Thus, the contact part 113 may not hit the medium to allow the medium to be poorly stacked.

However, in the current embodiment, since the medium colliding with the damper is reduced in deformation, the contact part 113 may hit the medium even though the contact part 113 of the sheet rollers 112 and 113 is reduced in length. Here, the contact part 113 may hit the medium when the medium is in a state as shown by reference B or c.

The medium hit by the contact part 113 may be reduced in deformation as shown by reference D and finally supported by the support guide 160 in a state where the medium is stacked on the stacking surface 170 as shown by reference E.

According to the current embodiment, the medium colliding with the damper is reduced in deformation, and thus the poor staking of the medium may be prevented. Also, since the contact part of the sheet roller has a length less than that of the contact part of the sheet roller when the rotation shaft is disposed under the stacking surface, the abrasion of the contact part may be prevented. Also, noises generated while the sheet roller rotates may be minimized.

Figure 6:
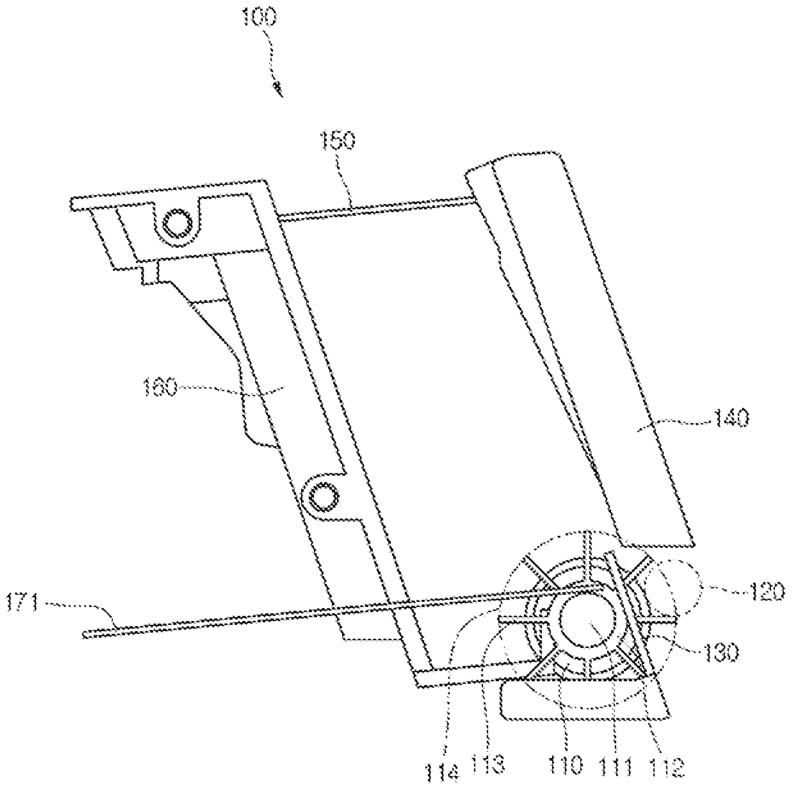
FIG. 6 is a view of a medium processing apparatus according to another embodiment.

FIG. 6 is a view of a medium processing apparatus according to another embodiment.

A medium processing apparatus according to the current embodiment has the same constitutions as those of the foregoing embodiments, however, the position of a rotation shaft is different from that in the foregoing embodiments. Thus, only specific portions of the current embodiment will be described below.

Referring to FIG. 6, in the medium processing apparatus according to the current embodiment, the stacking guide 140 may move toward the support guide 160 and move in a direction far away from the support guide 160. When the stacking guide 140 moves toward the support guide 160, the rotation shaft 111 of the sheet rollers 112 and 113 may be disposed under a stacking surface 171 to prevent interference between the stacking guide 140 and the rotation shaft 111 of the sheet rollers 112 and 113. Also, a portion of the first transfer roller 110 coupled to the rotation shaft 111 may be disposed above the stacking surface 171. Also, a portion of the sheet rollers 112 and 113 may be disposed above the stacking surface 171 according to a position of the rotation shaft 111.

Thus, the stacking guide 140 may move toward the support guide 160 without interfering with the rotation shaft 111 to press the medium stacked on the stacking surface 171 toward the support guide 160.

Here, a hole or a cutoff part may be defined in a lower side of the stacking guide 140 to prevent interference between the stacking guide 140 and the first transfer roller 110 and the sheet rollers 112 and 113, which are disposed above the stacking surface 171, from occurring while the stacking guide 140 moves toward the support guide 160.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium processing apparatus comprising:

a stacking surface on which a medium is stacked;

first and second transfer rollers for transferring the medium to be stacked onto the stacking surface;

a sheet roller for hitting the medium transferred by the first and second transfer rollers;

a rotation shaft to which the sheet roller is connected; and a damper with which the medium transferred by the first and second transfer rollers collides;

wherein the sheet roller comprises a body part connected to the rotation shaft and a contact part extending from the body part, wherein at least one portion of the body part of the sheet roller is disposed above the stacking surface, and wherein the sum of a length of the contact part and a height of the shortest medium is less than a distance between the stacking surface and the damper.

2. The medium processing apparatus of claim 1, wherein a portion or whole of the rotation shaft is disposed above the stacking surface.

3. The medium processing apparatus of claim 1, wherein the contact part has a length less than a diameter of the first transfer roller.

4. The medium processing apparatus of claim 1, wherein a minimum distance between a center of the rotation shaft and the damper is greater than the sum of a radius of the first transfer roller and a height of the tallest medium.

5. The medium processing apparatus of claim 1, wherein a distance between the damper and the stacking surface is greater than that between each contact point on which the medium contacts the first and second transfer rollers and the damper.

6. The medium processing apparatus of claim 1, wherein a distance between the damper and the stacking surface is greater than the sum of a height of the tallest medium colliding with the damper and a radius of the first transfer roller.

7. The medium processing apparatus of claim 1, further comprising a guide for guiding the medium to the first and second transfer rollers, wherein a portion of the guide is disposed above the stacking surface.

8. The medium processing apparatus of claim 1, further comprising a stopper for preventing the medium from being inserted between the rotation shaft and the support guide.

9. The medium processing apparatus of claim 8, wherein the stopper comprises:

a fixing part fixed to the stacking surface; and an extension part extending from the fixing part to shield at least a portion of a space between the rotation shaft and the support guide.

10. The medium processing apparatus of claim 9, wherein at least a portion of the extension part extends toward an upper portion of the rotation shaft.

11. The medium processing apparatus of claim 1, further comprising a stacking guide for guiding the first and second transfer rollers toward the damper, wherein the stacking guide moves toward the support guide without interfering with the first transfer roller.

12. A financial device comprising:

a customer information acquisition part for acquiring information of a customer;

a user interface for displaying a menu or information for depositing or withdrawing a medium and inputting or selecting a command or information for depositing or withdrawing the medium; and a medium processing apparatus for accepting and dispensing the medium, wherein the medium processing apparatus comprises:

a stacking surface on which the medium is stacked;

a sheet roller comprising a body part and at least one contact part extending from the body part to hit the medium to be stacked on the stacking surface; and a damper with which the medium transferred by first and second transfer rollers collides;

wherein a portion or whole of the body part is disposed above the stacking surface, and wherein a distance between the damper and the stacking surface is greater than that between each contact point on which the medium contacts the first and second transfer rollers and the damper.

13. The financial device of claim 12, wherein the medium processing apparatus further comprises:

a rotation shaft connected to the body part; and a first transfer roller connected to the rotation shaft to transfer the medium, wherein a portion or whole of the rotation shaft is disposed above the stacking surface.

14. The financial device of claim 13, wherein the at least one contact part has a length less than a diameter of the first transfer roller.

15. A medium processing apparatus comprising:

a stacking surface on which a medium is stacked to stand up;

first and second transfer rollers for transferring the medium to be stacked onto the stacking surface;

a sheet roller for hitting the medium transferred by the first and second transfer rollers; and a rotation shaft to which the sheet roller is connected;

wherein the sheet roller comprises a body part connected to the rotation shaft and a contact part extending from the body part, and wherein at least one portion of the body part of the sheet roller is disposed above the stacking surface.

16. The medium processing apparatus of claim 15, wherein the medium is stacked on the stacking surface so that a side of the medium that is longer than another side of the medium is supported by the stacking surface.

* * * * *